(No Model.)

T. H. BURKE & R. D. FASSETT.
NUT LOCK.

No. 467,027. Patented Jan. 12, 1892.

Witnesses
Chas A. Ford
W. S. Duvall

Inventors
Thomas H. Burke.
Riley D. Fassett.

By their Attorneys,
C. A. Snow & Co.

UNITED STATES PATENT OFFICE.

THOMAS H. BURKE AND RILEY D. FASSETT, OF CHILLICOTHE, MISSOURI.

NUT-LOCK.

SPECIFICATION forming part of Letters Patent No. 467,027, dated January 12, 1892.

Application filed September 12, 1891. Serial No. 405,533. (No model.)

*To all whom it may concern:*

Be it known that we, THOMAS H. BURKE and RILEY D. FASSETT, citizens of the United States, residing at Chillicothe, in the county of Livingston and State of Missouri, have invented a new and useful Nut-Lock, of which the following is a specification.

This invention relates to improvements in nut-locks, and to that particular class thereof known as "top," in which the nut is locked at its crown to the bolt.

The objects in view are to provide a fastener that will be effective in operation, may be easily applied and removed, and that is cheap and durable and adapted for locking nuts upon the bolts of railroad-joints or any other position in which a nut may be employed.

Further objects and advantages of the invention will appear in the following description, and the novel features thereof will be particularly pointed out in the claim.

Figure 1:
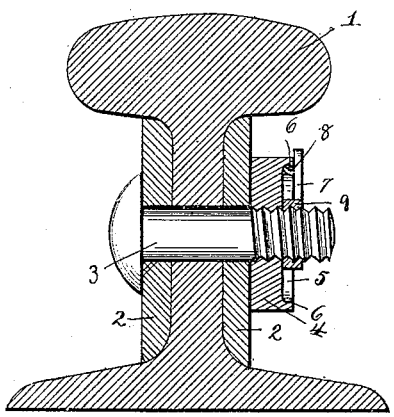
Figure 2:
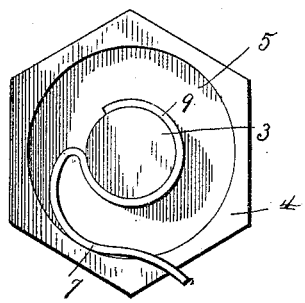
Figure 3:
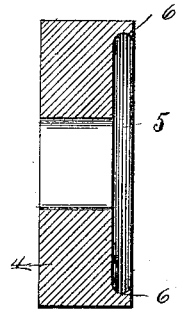
Figure 4:
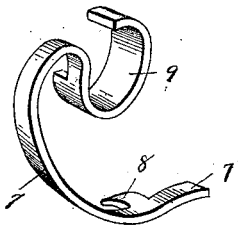

Referring to the drawings, Figure 1 is a section of a portion of a railroad-joint, the nut of which is locked in accordance with our invention. Fig. 2 is a detail enlarged of the nut and its bolt, together with its lock. Fig. 3 is a detail in transverse section of the bolt. Fig. 4 is a detail in perspective of the locking-key.

Like numerals of reference indicate like parts in all the figures of the drawings.

1 designates the rail-section; 2, the fish-bars, which, together with the sections, are perforated to receive the bolts 3, upon the ends of which are mounted the nuts 4. Each of the nuts 4 has its crown or front face concaved to form a recess 5, the wall of which has its inner surface curved or undercut, as shown at 6.

The locking-key is formed of spring sheet metal and consists of a narrow shank or stem portion 7, near the outer extremity of which is formed an outwardly-curved offset or spur 8, and at its opposite end said shank is widened and terminates in a head 9, which at its juncture with the shank is bent gradually around upon the shank and is concaved to fit the bolt.

In operation the nut is first screwed to its position upon the bolt and tightened by means of a wrench, and when sufficiently tight the concaved head of the key is placed against the bolt. The outer extremity of the shank 7 of the key is now forced inwardly by means of a wrench until the spur 8 has cleared the surrounding flange of the nut, after which the key is pushed toward the nut and the curved spur 8 engages with the undercut or curved wall thereof, from which it is kept from disengaging, and by its engagement the force of the spring is exerted to press the concaved head snugly against the threads of the bolt. The key having been mounted in position, it will be obvious that the entire tensile strength of the spring is exerted in wedging itself between the bolt and the wall of the nut and that the nut is prevented from rotating in either direction. The curvature given the spur and that given the wall prevents any accidental disconnection between the key and the nut.

It will be apparent that the fastener may be both cheaply and easily manufactured, applied, and removed, the removal, like the withdrawal, being preferably performed by means of an ordinary wrench.

Having described our invention, what we claim is—

The combination, with the nut having the concaved crown or face, the wall of which is undercut, of the spring locking-key bent upon itself to embrace the bolt at one end and having its rear or other end terminating in a shank provided with a depending spur curved to engage with the undercut or curved wall of the nut, substantially as specified.

In testimony that we claim the foregoing as our own we have hereto affixed our signatures in the presence of two witnesses.

THOMAS H. BURKE.
    RILEY D. FASSETT.

Witnesses:
 DOUGLASS STEWART,
 JOHN T. MOSS.